United States Patent [19]

Mollenbruck et al.

[11] 4,096,219
[45] Jun. 20, 1978

[54] PROCESS FOR PRODUCTION OF FOAMED SHAPED PIECES WITH PORELESS SURFACE MADE BY THE MOLDING PROCESS

[75] Inventors: Wilhelm Mollenbruck; Werner Bollmann, both of Marl, Germany

[73] Assignee: Chemische Werke Hüls Aktiengesellschaft, Germany

[21] Appl. No.: 704,083

[22] Filed: Jul. 9, 1976

[30] Foreign Application Priority Data

Jul. 9, 1975   Germany ............................. 2530511

[51] Int. Cl.² .................. B29D 27/08; B29F 5/00
[52] U.S. Cl. .................. 264/46.5; 264/53; 264/54; 264/DIG. 64; 264/261
[58] Field of Search .............. 264/45.4, 45.5, 46.4, 264/46.6, 46.7, 51, 53, 48, 46.9, 46.5, 45.1, 55, DIG. 64, 261, 259

[56] References Cited

U.S. PATENT DOCUMENTS

| | | | |
|---|---|---|---|
| 2,442,940 | 6/1948 | Staudinger et al. | 264/53 |
| 2,962,407 | 11/1960 | Aykanian | 264/45.4 |
| 3,054,146 | 9/1962 | Griffin | 264/DIG. 64 |
| 3,058,161 | 10/1962 | Beyer et al. | 264/45.5 |
| 3,253,064 | 5/1966 | Buonaiuto | 264/45.4 |
| 3,666,850 | 5/1972 | Windecker | 264/45.4 |
| 3,705,222 | 12/1972 | Rogers et al. | 264/338 |
| 3,767,742 | 10/1973 | Robin | 264/51 |
| 3,812,074 | 5/1974 | Oswitch et al. | 264/338 |
| 3,818,086 | 6/1974 | Stastny et al. | 264/DIG. 64 |
| 3,960,996 | 6/1976 | Balevski et al. | 264/45.5 |

*Primary Examiner*—Willard E. Hoag
*Attorney, Agent, or Firm*—Craig & Antonelli

[57] ABSTRACT

A process for producing foam-shaped pieces having a poreless and smooth surface from particulate expandable styrene polymer which comprises the steps of heating not prefoamed particles of expandable styrene polymer to a temperature between 100° and 170° C. under a pressure of between 3 and 30 bar to cause melting of the polymer cooling the melt polymer to temperatures of about 10° to 40° C. above the softening point of the styrene polymer, enlarging the capacity of the mold in which the particles are melted, expanding the resulting mold melt material without supplementary external delivery of heat and thereafter cooling the mold to about ambient temperature followed by removal of the shaped foamed piece.

11 Claims, 3 Drawing Figures

PROCESS FOR PRODUCTION OF FOAMED SHAPED PIECES WITH PORELESS SURFACE MADE BY THE MOLDING PROCESS

The present invention relates to a process for production of foamed shaped pieces with a continuous poreless, surface, from particulate expandable styrene polymers, wherein the expandable particles are first heated in a non-gas-tight mold at elevated pressure to temperatures above the softening point of the styrene polymer, are then cooled in the mold, and are foamed within the mold without renewed heating.

It is known that foamed shaped pieces can be prepared by the molding process if thermoplastic materials that contain a solid expanding agent are molded at temperatures above the softening point of the thermoplast and then foamed by renewed heating without pressure outside the mold.

This process requires the use of a solid expanding agent, and it has the disadvantage that the foamable material has to be expanded outside the mold by renewed heating in a second work step. With this procedure we do not arrive at a form-stable foamed shaped piece.

It is also known that thermoplasts containing a fluid expanding agent can be heated at high pressure to temperatures above the softening point of the thermoplast, cooled with maintenance of the pressure and then expanded by renewed heating outside the mold. Here also there are disadvantages similar to those of the process with solid expanding agents.

It is also known that small-particle expandable, at least partially prefoamed polystyrene particles can be bonded in a closing form with variable, capacity, the mold not being gas-tight, and that then the mold capacity can be enlarged and the shaped pieces expanded in the mold by renewed heating. According to this work process, it has been found that only foamed materials that consist of relatively loosely bonded individual particles can be obtained.

According to the state of the art, there are obtained foamed pieces with sufficient stability only by the mold process which, because of the high pressure that is applied, involves additional expense. However, foamed shaped pieces are not produced thereby in single work step: the pieces possibly receive a supplementary lamination because the expanding and the lamination that may be desired have to be undertaken in further work steps, conducted outside the mold.

In the work process that starts with small expansible particles in molds with variable capacity, we only get shaped pieces with inadequate stability.

The purpose of the invention is to develop a process that can be effected with relatively low pressures in a single mold with variable capacity, that allows production of foamed shaped pieces with sufficient stability and possibly also with simultaneous lamination.

The solution of this problem is found if particles of expandable styrene polymer, that have not been prefoamed, are melted in a single closing mold with variable capacity, that is not gas-tight—at temperatures above the softening point, between 100° and 170° C, at pressures between 3 and 30 bar, with maintenance of the pressure at temperatures that are about 10° to 40° C above the softening point of the styrene polymer; then the polymer melt is cooled, the capacity of the mold then enlarged to the desired size of the shaped piece, whereby the operation proceeds without further external application of heat, and finally after cooling to about 30° C the foamed shaped piece of polymer is removed.

According to a special embodiment of the process of the invention, a single-sided or two-sided laminated foamed shaped piece is obtained in a single work step, if before charging the expandable polystyrene particles, a laminating sheet is laid in the mold, and with two-sided lamination, another sheet of the desired laminating material is laid on the charged expandable particles. In production of such laminated foamed shaped pieces, the work can advantageously be accomplished without additional adhesives.

As particulate expandable styrene polymers, use may be made of styrene homopolymer, impact-resistant polystyrene and mixed polymers of styrene, e.g. with α-methyl styrene, acrylonitrile, methyl methacrylate, acrylic esters which comprise at least 50% by weight styrene monomer. As expanding agents, the styrene polymers receive—as is known—liquid or gaseous expanding agents that only swell and do not dissolve the polymer, and which boil below the softening point of the styrene polymer. Here it may be mentioned the known hydrocarbons such as pentane, isopentene, hexane, cyclohexane and halogen-containing hydrocarbons such as dichlorodifluoroethane. Obviously, there may also be mixtures of these expanding agents which generally are used in amounts of 2 to 15, especially between 5 and 7% by weight based on the weight of the polymer particles. Moreover, the expandable styrene polymers may contain fillers, flame-proofing agents and dyes in the usual way.

The expandable particles are not prefoamed in the process of the invention, which saves another work step and intermediate holding.

The expandable particles are charged into a closable heatable mold with variable capacity, the mold not being gas-tight. The mold may be already heated when the material is charged into it. After filling of the mold, the mold is closed and the closed mold is heated, advantageously with steam or oil, or electrically without locking pressure.

The temperature at the surface of the movable upper mold is then between 100° and 170° C, especially between 120° and 160° C. The pressure, which may be substantially lower than in the usual molding process, is generally between 3 and 30 bar, advantageously between 10 and 20 bar. After the fusing of the particles, the upper and lower parts of the mold are cooled to temperatures that are about 10° to 40° C., advantageously 20° to 30° C., above the softening point of the styrene polymer. This is generally in a temperature range between 100° and 130° C., advantageously 110° and 120° C, with maintenance of the pressure. After the desired temperature is reached, the upper mold is moved, by a stroke that corresponds to the desired thickness of the finished foam. The available intrinsic heat within the thermoplast and the residual heat of the mold are sufficient for the necessary expansion. A further external application of heat is not necessary. Expansion time generally, depending upon the size of the mold, is 2 to 4 minutes. In the expansion there is considerable cooling. Finally the mold temperature is reduced to about 30° C. which can be effected by delivery of water or oil, and the finished piece is removed from the mold.

Similarly, it is possible to prepare foamed layers or plates that are coated on one or both sides, whereby—as already indicated--advantageously, with no need for additional adhesive, the process can be effected in a single work step. If desired, of course, adhesives may be utilized.

Suitable coating materials are foils, sheets, or plates of thermoplastic synthetic resins such as polystyrene, polyvinyl chloride, polyethylene, as well as asbestos cement, plasterboard or ceramic plates, wood plates or plywood.

According to the process of the invention there is simple production of insulating board, structural board, shaped pieces, elements with high strength and dense surfaces, in a single form without extra work steps.

EXAMPLE 1

In a mold (500 × 500 mm) that can be heated by oil, steam or electricity, 1400 grams of not prefoamed expandable polystyrene particles are charged. The used expandable polystyrene particles contain as expanding agent about 6% by weight of a mixture of about 15% (10-30%) by weight isopentane and about 85% (90-70%) by weight pentane. The mold is closed and heated to 150° C. without locking pressure. After reaching 150° C., there is plasticized (melted) within 3 minutes. Finally the molding pressure is immediately continuously raised to 20 to 25 kp/cc. After the molding pressure is reached, the mold is cooled to the expansion temperature of 120° C. under said pressure within 6 minutes. Thereafter the upper mold part is lifted to the desired expansion height and fixed. The expansion time is 3 minutes, with no application of heat. After the expansion time has passed, there is cooling to the removal temperature of about 25° C.

EXAMPLE 2

In a form (500×500 mm) that can be heated with oil, steam, or electricity, ceramic tiles are laid in the lower mold half, and over the tiles 1400 grams of not prefoamed expandable polystyrene particles corresponding to that of example 1 are distributed. The subsequent course of the process corresponds to that of example 1. The ceramic surface is bonded firmly to the obtained shaped piece, without use of an adhesive. The well-known expandable polystyrene particles which are to be used in the process according to the invention generally have a particle size between 0.4 and 3 mm diameter. Also those with a greater diameter may be used, said is to say the particles' size is not critical.

The time till the particles have melted is only a few minutes and naturally depends upon the amount of the particles used, i.e., using 1.5 kg expandable polystyrene the time is 3 minutes, using 2.5 kg the time is 3.5 minutes. Immediately the particles have been in the molten condition follows the cooling step to a temperature about 10° to 40° C. above the softening point of the styrene polymer. The melted particles therefore must not be maintained in the molten condition. The cooling time depends upon the amount of the expandable polystyrene, the material of the mold (heat conductivity) and the desired specific weight of the foamed shaped pieces; it differs only a few minutes. The cooling time lies generally between 3 and 7 minutes at a specific weight of the foamed shaped pieces from about 0.07 grs/cm³. The mold is filled in a height from about 8 to 10% of the height of the foamed shaped pieces. In other words the movable upper mold is lifted 10 to 12 fold the height of the original height of the unfoamed expandable polystyrene.

Features of the invention will be additionally apparent in conjunction with the accompanying drawings, wherein FIG. 1 shows the cross section of the unclosed mold 1 filled with non prefoamed expandable polystyrene 2. Cooling and heating means are not shown.

Figure 1:
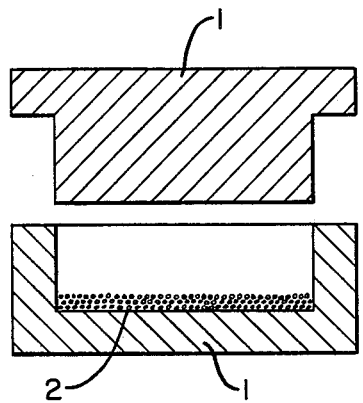
Figure 2:
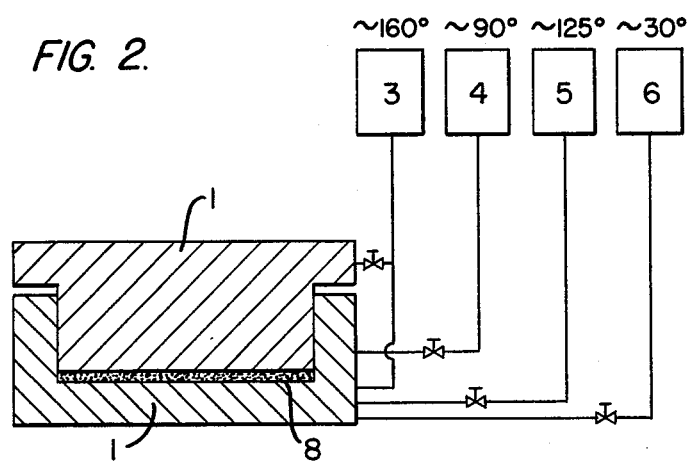
FIG. 2 shows said cross section of the closed mold during the pressure-and-melting-step and the cooling step.
Figure 3:
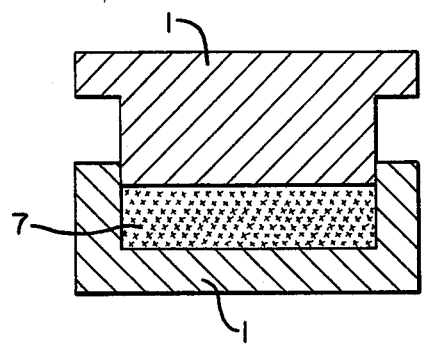
FIG. 3 shows the closed mold during the expanding step. Cooling and heating means are not shown.

As shown in FIG. 1 the preheated or not preheated mold 1 is filled with the non prefoamed expandable polystyrene particles 2. The amount of said polystyrene is at least that a non foamed (compact) shaped piece 8 theoretically can be formed. After filing the mold 1 is closed and heated. As shown in FIG. 2 numbers 3, 4, 5 and 6 call the usual temperatures especially applied during the successive steps of the process; the corresponding lines call means by which heating or cooling take place. The polystyrene particles are plasticized between 150° and 170° C. (about 160° C. [3]). The temperature of the molds' frame is about 90° C. [4]. After the fusing of the particles is cooled to the expansion temperature of about 125° C. [5]. The upper mold part as shown in FIG. 3 is lifted to the desired expansion height and fixed. After expansion there is cooled to removal temperature of about 30° C. [6].

We claim:

1. A process for production of foamed shaped pieces with poreless surface, from particles of an expandable styrene polymer material, wherein the expandable particles are heated at elevated pressure to temperatures above the softening point of the styrene polymer material, cooled with maintenance of the pressure, and foamed after reduction of the pressure, which comprises the steps of, in a single closing mold that is not gas-tight and that has a variable capacity, melting particles of expandable styrene polymer material which are not prefoamed, at pressures between 3 to 30 bar and temperatures between 100° and 170° C., cooling the melted material to temperatures about 10 to 40° C. above the softening point of the styrene polymer material, then enlarging the capacity of the mold, and expanding the polymer material without supplementary external delivery of heat, and finally after further cooling of the mold to about ambient temperature, removing the shaped piece from the mold.

2. A process according to claim 1 for the production of foamed shaped pieces that are laminated on one or both sides, wherein before charging the particulate expandable styrene polymer material that is not prefoamed into the mold, a sheet of material that is to constitute a surface of the resulting laminated material is laid in the mold and the charged particles are covered with another sheet of material that is to constitute another surface of the laminated material, and the shaping procedure is effected without supplementary adhesives.

3. A process according to claim 1, wherein said styrene polymer material comprises a homopolymer or copolymers of styrene containing at least 50% by weight of styrene monomer.

4. A process according to claim 1, wherein the melted material is cooled to a temperature of about 20° to 30° C. above the softening point of the styrene polymer material during the first cooling step.

5. The process according to claim 1, wherein the capacity of the mold is enlarged from 10 to 12 fold by height based on the height of the original charge of particles of styrene polymer material.

6. A process for producing foamed shaped pieces having a porous and smooth surface from particulate expandable styrene polymer which comprises the steps of charging non-prefoamed expandable styrene particles into a non-gas-tight mold, closing the mold to encompass the charge of particles of expandable styrene polymer therein whereby the charge of particles fills the capacity of the mold interior, heating the particles of expandable styrene polymer to a temperature between 100° and 170° C. under a pressure of between 3 and 30 bar to cause melting of the polymer particles within said closed mold, cooling the melted polymer particles to temperatures of about 10° to 40° C. above the softening point of the styrene polymer within said closed mold while maintaining said pressure, then enlarging the capacity of the mold in which the particles are melted to the desired size of the shaped piece, and simultaneously expanding the cooled melted particles contained within the mold to fill the enlarged capacity of the mold without supplementary external delivery of heat to the mold, with a foam, cooling the mold to about ambient temperature and thereafter effecting removal of the foamed shaped piece from said cooled mold.

7. A process according to claim 6, wherein said mold is closed by lowering an upper portion of the mold into contact with the charge of particles of expandable styrene polymer introduced into said mold and the capacity of the mold is enlarged by raising the upper portion of the mold to define a space within the mold which corresponds to the desired size of the shaped piece.

8. A process according to claim 6, wherein the mold is heated between 120° and 160° C. and cooled to a temperature between 100° and 130° C. prior to effecting expansion of the mold.

9. A process according to claim 6, wherein the capacity of the mold is enlarged from 10 to 12 fold of the height of the original height of the charge of non-foamed, expandable, particles of styrene polymer contained witin said mold.

10. A process according to claim 6, wherein said expandable styrene polymer particles contain an expanding agent that only swell and do not dissolve the polymer and which boil below the softening point of the styrene polymer.

11. A process according to claim 10, wherein the expanding agent is contained within the expandable styrene particles in an amount that is between 5 and 7 % by weight based on the weight of the polymer particles.

* * * * *